(12) United States Patent
Enderwick et al.

(10) Patent No.: US 8,955,152 B1
(45) Date of Patent: Feb. 10, 2015

(54) SYSTEMS AND METHODS TO MANAGE AN APPLICATION

(75) Inventors: Thomas Jeffrey Enderwick, San Francisco, CA (US); Christopher Edward Perret, Carlsbad, CA (US); Azim Ozakil, San Jose, CA (US); Stephen James Scalpone, Portland, OR (US)

(73) Assignee: Symantec Corporation, Mountain View, CA (US)

( * ) Notice: Subject to any disclaimer, the term of this patent is extended or adjusted under 35 U.S.C. 154(b) by 110 days.

(21) Appl. No.: 13/493,876

(22) Filed: Jun. 11, 2012

Related U.S. Application Data

(63) Continuation-in-part of application No. 13/226,351, filed on Sep. 6, 2011, and a continuation-in-part of application No. 13/355,529, filed on Jan. 21, 2012.

(60) Provisional application No. 61/520,514, filed on Jun. 11, 2011, provisional application No. 61/402,934, filed on Sep. 7, 2010, provisional application No. 61/461,710, filed on Jan. 22, 2011.

(51) Int. Cl.
*G06F 21/00* (2013.01)
*G06F 21/10* (2013.01)
*H04L 29/06* (2006.01)
*G06F 21/60* (2013.01)
*G06F 11/36* (2006.01)

(52) U.S. Cl.
CPC ............... *G06F 21/10* (2013.01); *H04L 63/20* (2013.01); *G06F 21/60* (2013.01); *G06F 11/36* (2013.01)

USPC ......... 726/28; 726/1; 726/26; 726/33; 705/51

(58) Field of Classification Search
CPC ......... G06F 21/10; G06F 21/60; G06F 11/36; H04L 63/20
USPC ............................... 726/1, 26, 28, 33; 705/51
See application file for complete search history.

(56) References Cited

U.S. PATENT DOCUMENTS

| | | | |
|---|---|---|---|
| 5,138,712 | A | 8/1992 | Corbin et al. |
| 5,737,416 | A | 4/1998 | Cooper et al. |
| 6,005,935 | A | 12/1999 | Civanlar et al. |
| 6,035,403 | A | 3/2000 | Subbiah et al. |
| 6,134,593 | A | 10/2000 | Alexander et al. |
| 6,134,659 | A | 10/2000 | Sprong et al. |
| 6,243,468 | B1 | 6/2001 | Pearce et al. |
| 6,260,141 | B1 | 7/2001 | Park |
| 6,460,140 | B1 | 10/2002 | Schoch et al. |
| 6,615,191 | B1 | 9/2003 | Seeley |
| 6,658,571 | B1 * | 12/2003 | O'Brien et al. ............... 726/26 |
| 6,801,999 | B1 | 10/2004 | Venkatesan et al. |
| 7,134,016 | B1 | 11/2006 | Harris |

(Continued)

OTHER PUBLICATIONS

Grier et al., Secure web browsing with the OP web browser, 2008, IEEE.

(Continued)

*Primary Examiner* — Dede Zecher
*Assistant Examiner* — Sarah Su
(74) *Attorney, Agent, or Firm* — Holland & Hart LLP

(57) ABSTRACT

A computer-implemented method to revoke an application is described. The processor monitors for a revocation condition. Upon detection of the revocation condition, the process also generates a command for a framework of a managed application to revoke the managed application.

18 Claims, 19 Drawing Sheets

(56) References Cited

U.S. PATENT DOCUMENTS

| | | | |
|---|---|---|---|
| 7,949,998 B2* | 5/2011 | Bleisch et al. | 717/120 |
| 8,452,712 B2* | 5/2013 | Garst et al. | 705/59 |
| 2001/0011254 A1 | 8/2001 | Clark | |
| 2001/0039625 A1 | 11/2001 | Ananda | |
| 2001/0044782 A1 | 11/2001 | Hughes et al. | |
| 2001/0051928 A1 | 12/2001 | Brody | |
| 2002/0073316 A1 | 6/2002 | Collins et al. | |
| 2002/0087883 A1 | 7/2002 | Wohlgemuth et al. | |
| 2003/0135756 A1 | 7/2003 | Verma | |
| 2003/0177351 A1 | 9/2003 | Skingle | |
| 2003/0191823 A1* | 10/2003 | Bansal et al. | 709/220 |
| 2004/0107368 A1 | 6/2004 | Colvin | |
| 2004/0148525 A1 | 7/2004 | Aida et al. | |
| 2004/0167859 A1 | 8/2004 | Mirabella | |
| 2004/0168061 A1 | 8/2004 | Kostal et al. | |
| 2004/0199766 A1 | 10/2004 | Chew et al. | |
| 2004/0202324 A1 | 10/2004 | Yamaguchi et al. | |
| 2005/0005098 A1 | 1/2005 | Michaelis et al. | |
| 2005/0021992 A1 | 1/2005 | Aida et al. | |
| 2005/0049970 A1 | 3/2005 | Sato et al. | |
| 2005/0091511 A1 | 4/2005 | Nave et al. | |
| 2005/0097348 A1 | 5/2005 | Jakubowski et al. | |
| 2005/0222958 A1 | 10/2005 | Hasegawa et al. | |
| 2006/0026690 A1 | 2/2006 | Yu | |
| 2006/0069926 A1 | 3/2006 | Ginter et al. | |
| 2006/0123412 A1* | 6/2006 | Hunt et al. | 717/174 |
| 2007/0157310 A1* | 7/2007 | Kondo et al. | 726/22 |
| 2007/0174424 A1 | 7/2007 | Chen et al. | |
| 2007/0186112 A1 | 8/2007 | Perlin et al. | |
| 2007/0287471 A1* | 12/2007 | Wood | 455/456.1 |
| 2008/0072297 A1 | 3/2008 | Lu et al. | |
| 2008/0134347 A1 | 6/2008 | Goyal et al. | |
| 2008/0148363 A1 | 6/2008 | Gilder et al. | |
| 2008/0267406 A1 | 10/2008 | Asokan et al. | |
| 2009/0031396 A1* | 1/2009 | Jung et al. | 726/1 |
| 2009/0055749 A1* | 2/2009 | Chatterjee et al. | 715/738 |
| 2009/0077637 A1 | 3/2009 | Santos et al. | |
| 2009/0119218 A1 | 5/2009 | Ooki | |
| 2009/0217367 A1* | 8/2009 | Norman et al. | 726/8 |
| 2009/0327091 A1 | 12/2009 | Hartin et al. | |
| 2010/0050251 A1* | 2/2010 | Speyer et al. | 726/20 |
| 2010/0192234 A1 | 7/2010 | Sugimoto et al. | |
| 2010/0212028 A1* | 8/2010 | Eriksson et al. | 726/32 |
| 2010/0228870 A1* | 9/2010 | Terry | 709/229 |
| 2010/0281537 A1 | 11/2010 | Wang et al. | |
| 2010/0287618 A1* | 11/2010 | Howell et al. | 726/26 |
| 2010/0293103 A1 | 11/2010 | Nikitin et al. | |
| 2010/0299376 A1* | 11/2010 | Batchu et al. | 707/955 |
| 2010/0304872 A1* | 12/2010 | Gatto et al. | 463/43 |
| 2010/0306668 A1* | 12/2010 | Williams et al. | 715/741 |
| 2011/0138174 A1 | 6/2011 | Aciicmez et al. | |
| 2012/0137281 A1* | 5/2012 | Kleiner et al. | 717/174 |
| 2012/0311718 A1* | 12/2012 | McCarty | 726/26 |
| 2014/0215555 A1* | 7/2014 | Barton et al. | 726/1 |

OTHER PUBLICATIONS

Pfeiffer et al., Accessibility for the HTML5 <video> element, 2009, ACM.

Bartoletti et al., Jalapa: Securing Java with Local Policies, 2009.

* cited by examiner

SYSTEMS AND METHODS TO MANAGE AN APPLICATION

RELATED APPLICATIONS

This application claims priority to U.S. Provisional Application No. 61/520,514, entitled APPARATUS FOR THE DISTRIBUTION AND ENHANCEMENT OF APPLICATIONS, and filed on Jun. 11, 2011, which is incorporated herein in its entirety by this reference. This application is a continuation in part of U.S. application Ser. No. 13/226,351, entitled SYSTEM FOR THE DISTRIBUTION AND DEPLOYMENT OF APPLICATIONS, WITH PROVISIONS FOR SECURITY AND POLICY CONFORMANCE, and filed on Sep. 6, 2011, which claims priority to U.S. Provisional Application No. 61/402,934, entitled SYSTEM FOR THE DISTRIBUTION AND DEPLOYMENT OF APPLICATIONS, WITH PROVISIONS FOR SECURITY AND POLICY CONFORMANCE, and filed on Sep. 7, 2010 and is also a continuation in part of U.S. application Ser. No. 13/355,529, entitled POLICY ENFORCING BROWSER, and filed on Jan. 21, 2012, which claims priority to U.S. Provisional Application No. 61/461,710, entitled SYSTEM FOR THE DISTRIBUTION AND DEPLOYMENT OF APPLICATIONS, WITH PROVISIONS FOR SECURITY AND POLICY CONFORMANCE, and filed on Jan. 22, 2011, each of which is incorporated herein in its entirety by these references.

BACKGROUND

The use of computer systems and computer-related technologies continues to increase at a rapid pace. This increased use of computer systems has influenced the advances made to computer-related technologies. Indeed, computer systems have increasingly become an integral part of the business world and the activities of individual consumers. Computer systems may be used to carry out several business, industry, and academic endeavors. The wide-spread use of computers has been accelerated by the increased use of computer networks, including the Internet.

Many computer systems run applications. Applications have become widely available and are often used to enhance efficiency and ease of use. Unfortunately, many applications are unsecure and/or untrusted. In some cases, unsecure and untrusted applications present a security risk to data (e.g., on-device data and off device data) and systems.

SUMMARY

A computer-implemented method to revoke an application is described. The processor monitors for a revocation condition. Upon detection of the revocation condition, the process also generates a command for a framework of a managed application to revoke the managed application.

The processor may also determine whether the command is a deleting command. Upon determining that the command is a deleting command, the process may delete at least a portion of on-device data. The processor may additionally determine whether the command is a disabling command. Upon determining that the command is a disabling command, the processor may also prevent the managed application from running. The processor may additionally monitor the at least one policy. The processor may further determine that the at least one policy has been violated.

In one example, the revocation condition may include a revocation message. In another example, the revocation condition may include a violation of at least one policy.

In some cases, the at least one policy may include a requirement for an operating system. In some cases, the at least one policy may include a requirement for the managed application. In one embodiment, the at least one policy may be built into the framework of the managed application.

A computing device configured to revoke an application is also described. The computing device includes a processor, memory in electronic communication with the processor, and instructions stored in the memory. The instructions being executable by the processor to monitor for a revocation condition. Upon detection of the revocation condition, the instructions also being executable by the processor to generate a command for a framework of a managed application to revoke the managed application.

A computer-program product to revoke an application is additionally described. The computer-program product includes a non-transitory computer-readable storage medium that stores computer executable instructions. The instructions being executable by a processor to monitor for a revocation condition. Upon detection of the revocation condition, the instructions are further executable by the processor to generate a command for a framework of a managed application to revoke the managed application.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
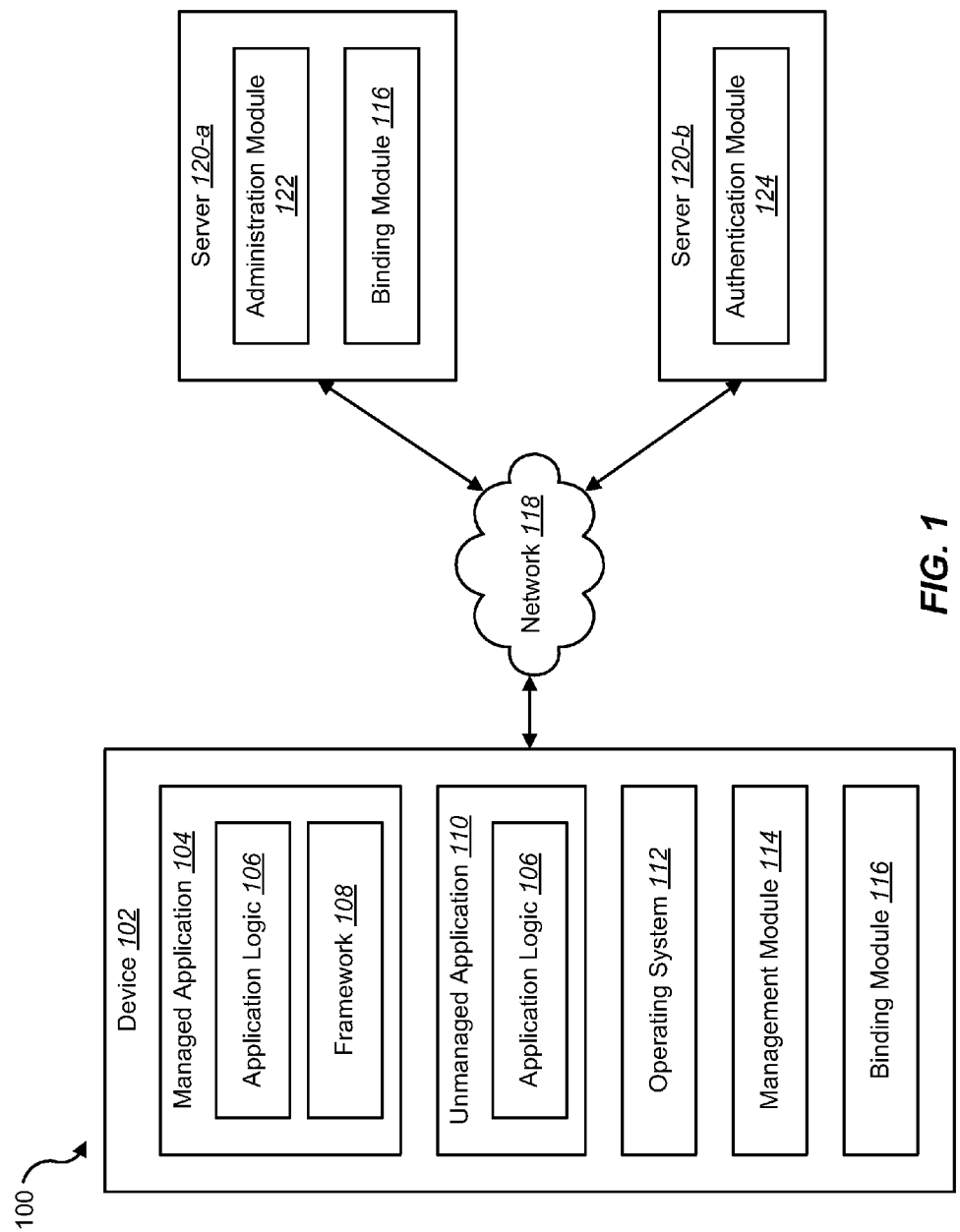
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

FIG. 1 is a block diagram illustrating one embodiment of an environment 100 in which the present systems and methods may be implemented. In one example, a device 102 may be configured for running one or more applications. Examples of devices 102 include mobile devices, tablets, cellular phones, computers, servers, etc. In some configurations, the device 102 may include one or more operating systems 112 (e.g., iOS, Android, etc.). In some cases, an operating system 112 may provide an executing environment for an application (e.g., managed application 104, unmanaged application 110). In some configurations, the device 102 may include one or more managed applications 104 and/or one or more unmanaged applications 110.

The managed application 104 and the unmanaged application 110 may each include application logic 106. In one example, the application logic 106 may be the software that defines the application (provides the one or more specific functionalities of the application, for example). In some cases, the application logic 106 may seek to perform undesirable, unnecessary, and/or unsecure, etc. functions along with the desired functions. For example, a music playing application may unnecessarily seek access to a user's address book while the music is playing. In many cases, a user must accept undesirable, unnecessary, and/or unsecure, etc. functionality in order to use the desired functionality of the application logic.

The unmanaged application 110 may include application logic 106. In one example, the application logic 106 of the unmanaged application 110 may directly interface with the operating system 112.

The managed application 104 may include application logic 106 and a framework 108. In one example, the framework 108 may include an interface layer that manages the interaction between the application logic 106 and the operating system 112 and/or other applications. In some configurations, the framework 108 may enforce one or more policies (e.g., security policies) to manage and/or constrain the operation of the application logic 106. For instance, in the case of the music playing application that unnecessarily seeks access to the user's address book, the framework 108 may disable the application logic 106 from accessing the user's address book. In one scenario, the framework 108 may have a policy that provides a dummy (e.g., empty substitute) address book to the application logic 106. In another scenario, the framework 108 may specify that any data written to the device 102 is encrypted. Thus, the framework 108 may allow unsecure application logic 106 to be secured based on one or more policies.

The device 102 may also include a management module 114 and/or a binding module 116. The management module 114 may manage one or more managed applications 104. The binding module 116 may wrap application logic 106 with a framework 108 to generate a managed application 104. In some configurations, the management module 114 and/or the binding module 116 may be included in an application (e.g., managed application 104, unmanaged application 110). In other configurations, the management module 114 and/or the binding module 116 may be integrated as a part of the operating system 112. The management module 114 and the binding module 116 will be discussed in further detail below.

In some configurations, the device 102 may communicate to one or more servers 120 through a network 118. Examples of networks 118 include packet switched networks, internet protocol (IP) networks, proprietary networks, etc. For instance, the network 118 may include telephone lines, fiber optic cables, cellular networks, wireless networks, satellite networks, undersea telephone cables, and the like.

In one embodiment, the device 102 may communicate with a first server 120-a over the network 118. In some cases, the first server 120-a may be an application server, an application gateway, and/or an application market place. In some configurations, the first server 120-a may include an administration module 122 and/or the binding module 116. The administration module 122 may administer and manage the policies for one or more managed applications 104. The administration module 122 will be discussed in further detail below.

In one embodiment, the device 102 may communicate with a second server 120-b over the network 118. In some configurations, the second server 120-b may include an authentication module 124. In some configurations, the authentication module 124 may provide authentication data (e.g., a token) that enables a user, device 102, and/or application (e.g., unmanaged application 110, managed application 104) to provide the needed authentication and/or authorization to access a resource (the application marketplace on the first server 120-a, for example).

Figure 2:
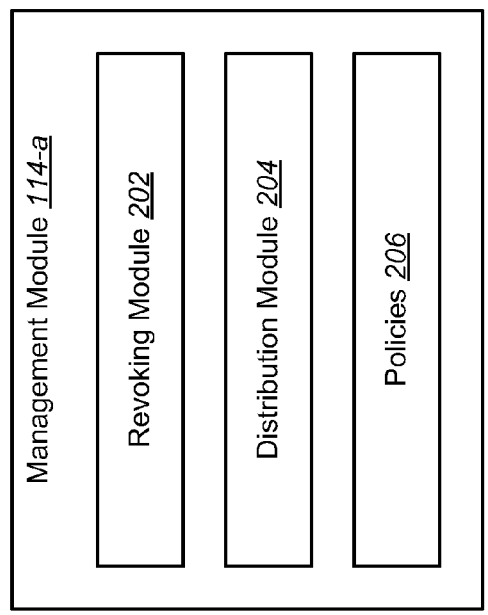
FIG. 2 is a block diagram illustrating one embodiment of a management module.

FIG. 2 is a block diagram illustrating one embodiment of a management module 114-a. The management module 114-a may be one example of the management module 114 illustrated in FIG. 1. In some configurations, the management module 114-a may include a revoking module 202, a distribution module 204, and one or more policies 206.

In one embodiment, the revoking module 202 may revoke one or more managed applications 104. In some configurations, the revoking module 202 may revoke an application based on one more policies 206. The revoking module 202 will be discussed in further detail below. In one embodiment, the distribution module 204 may facilitate the distribution of one or more applications (e.g., web applications, unmanaged applications 110, managed applications 104, etc.). In some configurations, the distribution module 204 may distribute one or more applications based on one or more policies 206. In some configurations, the policies 206 may be uniformly administrated (via the administration module 122, for example).

Figure 3:
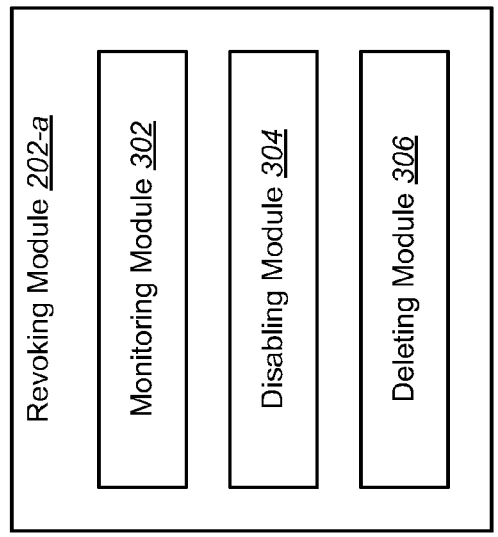
FIG. 3 is a block diagram illustrating one embodiment of a revoking module.

FIG. 3 is a block diagram illustrating one embodiment of a revoking module 202-a. The revoking module 202-a may be one example of the revoking module 202 illustrated in FIG. 2. In some configurations, the revoking module 202-a may include a monitoring module 302, a disabling module 304, and a deleting module 306.

In one embodiment, the monitoring module 302 may monitor for violation of a policy 206. For example, the monitoring module 302 may ensure that the device 102 and/or the application is not in violation of a policy 206.

In one example, a policy 206 may specify that a managed application 104 communicate with a server at least once every 36 hours. If the monitoring module 302 determines that the managed application 104 has not communicated with the server in the specified time period, the revoking module 202-a may revoke the managed application 104 based on the policy. For instance, the revoking module 202-a may disable the managed application 104 and/or delete some or all of the data associated with the managed application 104. In another example, the policy 206 may specify that the device 102 run an official operating system 112 (that is not jailbroken, for example). If the monitoring module 302 determines that the operating system 112 is not a conformant or approved version of an operating system, the revoking module 202-a may revoke the managed application 104.

In another embodiment, the revoking module 202 may monitor for a revocation message. For example, an administrator may send a message (via an administration module 122, for example) indicating that one or more particular applications should be revoked. For instance (in the case of the termination of an employee), the revoking module 202 may receive a message to wipe all work related data and work related applications (e.g., managed applications 104) from a device 102. In this way, data and applications associated with work may be revoked without affecting a user's personal data or personal applications.

In one embodiment, the disabling module 304 may disable an application (e.g., managed application 104) from running. For example, the disabling module 304 may generate a command for the framework 108 that prevents the application from running.

In one embodiment, the deleting module 306 may delete some or all of the data associated with an application (e.g., managed application 104). For example, the deleting module 306 may delete some or all of the sensitive information associated with the application. In another example, the deleting module 306 may delete some or all of the files associated with the application and the application itself.

Figure 4:
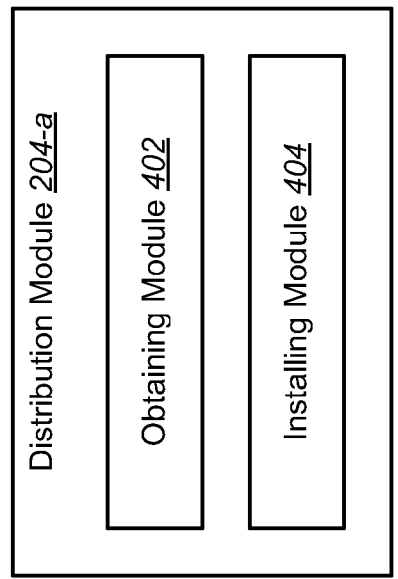
FIG. 4 is a block diagram illustrating one embodiment of a distribution module.

FIG. 4 is a block diagram illustrating one embodiment of a distribution module 204-a. The distribution module 204-a may be one example of the distribution module 204 illustrated in FIG. 2. In some configurations, the distribution module 204-a may include an obtaining module 402 and an installing module 404.

In one embodiment, the obtaining module 402 may obtain an application (e.g., web application, managed application 104, unmanaged application 110). For example, the obtaining module 402 may obtain a web application launcher (e.g., web clip for iOS, shortcut for Android).

In one embodiment, the installing module 404 may automatically install the web application launcher. For example, the installing module 404 may automatically install the web application launcher based on the platform (e.g., operating system 112 and/or device 102) where the web application launcher is being installed. For instance, the installing module 404 may determine the configuration settings needed to automatically install the web application given the specifics of the platform.

Figure 5:
FIG. 5 is a block diagram illustrating one embodiment of a binding module.

FIG. 5 is a block diagram illustrating one embodiment of a binding module 116-a. The binding module 116-a may be one example of the binding module 116 illustrated in FIG. 1. In some configurations, the binding module 116-a may include a checking module 502, a wrapping module 504, and one or more policies 506.

In one embodiment, the checking module 502 may check the application logic 106 to ensure that errors do not exist in the application logic. For example, the checking module 502 may determine if the application logic 106 is packaged correctly. Examples of errors include mismatched credentials, malformed files or folders, incorrect formats, etc. In some cases, the checking module 502 may repair errors associated with the application logic 106. The checking module 502 will be discussed in further detail below.

In one embodiment, the wrapping module 504 may wrap application logic 106 and a framework 108 together based on one or more policies. In some cases, the wrapping module 504 may bind the application logic 106 and the framework 108 together on the device 102 without any communication with another entity. In other cases, the binding module 116-a may transmit log data or other data back to a server (e.g., server 120-a). In one example, the binding module 116-a communicates with one or more servers (e.g., server 120-a) to obtain policy information, framework updates, and/or alternate framework implementations. In some configurations, policy information may be baked in to the framework 108. In some cases, the wrapping module 504 may additionally include packages, policies, and/or additional logic, etc. to integrate additional security and/or functionality. For example, encrypting capabilities may be added to enhance data protection. In one example, the managed application 104 may be installed on the device 102.

In another embodiment, the wrapping module 504 may transmit (e.g., push) the application logic 106 to a server (e.g., server 120-a). In one example, the binding unit 116 on server may receive the application logic 106 and may bind the application logic 106 with framework 108 based on one or more policies. In this example, the server may transmit (e.g., push) the resulting bound application logic (e.g., the managed application 104) back to the binding unit 116-a on the device 102. In one example, the managed application 104 may be installed on the device 102.

In some configurations, the operation of the checking module 502 and the operation of the wrapping module 504 may be based on one or more policies 506. In some cases, the policies 506 may be uniformly administrated (via the administration module 122, for example).

In some cases, the binding module 116-a may be integrated into an application. In this scenario, one application on the device 102 may bind another application on the device 102 without any interaction from another device.

Figure 6:
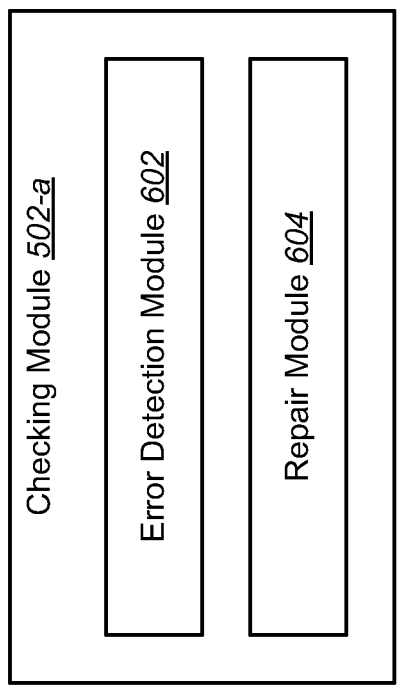
FIG. 6 is a block diagram illustrating one embodiment of a checking module.

FIG. 6 is a block diagram illustrating one embodiment of a checking module 502-a. The checking module 502-a may be one example of the checking module 502 illustrated in FIG. 5. In some configurations, the checking module 502-a may include an error detection module 602 and a repair module 604.

In one embodiment, the error detection module 602 may detect errors in application logic 106. For example, the error detection module 602 may detect errors that may cause distribution failures. For instance, the error detection module 602 may detect an error in the way the application logic 106 was packaged, missing or malformed folders or files, improperly signed objects, mismatched credentials used in signing, etc. For instance, a missing provisioning profile may inhibit the application from being installed. In some cases, a missing provisioning profile may not be an error if the provisioning profile will be received separately from the application logic 106.

In one embodiment, the repair module 604 may repair and/or correct one or more errors associated with application logic 106. For instance, the repair module 604 may correct one or more errors so that the application logic 106 may be installed correctly.

Figure 7:
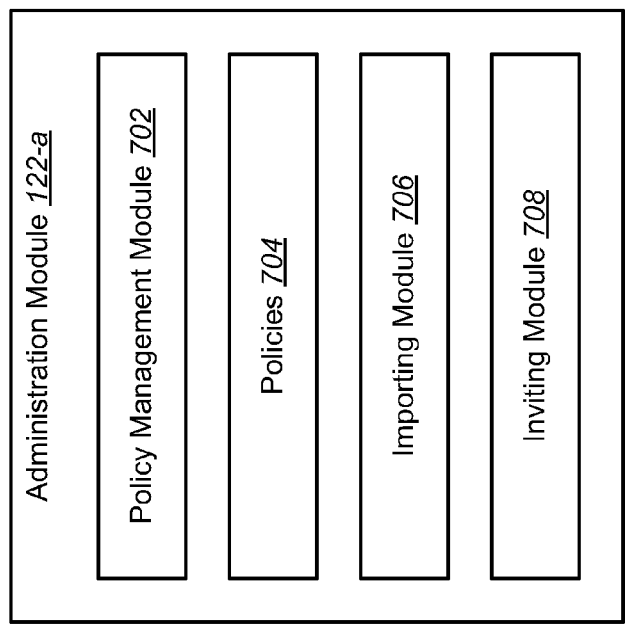
FIG. 7 is a block diagram illustrating one embodiment of an administration module.

FIG. 7 is a block diagram illustrating one embodiment of an administration module 122-a. The administration module 122-a may be one example of the administration module 122 illustrated in FIG. 1. In some configurations, the administration module 122-a may include a policy management module 702, one or more policies 704, an importing module 706, and/or an inviting module 708.

In one embodiment, the policy management module 702 may allow an administrator to manage the various policies 704 that are enforced. In some configurations, the policies 206 illustrated in FIG. 2 and/or the policies 506 illustrated in FIG. 5 are at least a subset of the policies 704. For example, an administrator may apply a first set of revoking policies for a first managed application and a second set of revoking policies for a second managed application. Similarly, the administrator may apply particular distribution policies, binding policies, checking policies, etc., for one or more individual managed applications or one or more groups of managed applications, such as the managed application 104.

In one embodiment, the importing module 706 may import one or more user profiles into an administrative system (managed by the administration module, for example). For example, one or more user profiles may be imported so that each user may access one or more managed applications 104 based on a determined set of policies 704.

In one embodiment, the inviting module 708 may invite one or more users to participate in an administrative system via a digital communication. For example, the inviting module 708 may send an invitation via email, Short Message Service (SMS), Multimedia Message Service (MMS), posting a link (e.g., Uniform Resource Locator (URL)) on a web site, posting a link in a public forum, etc. In some configurations, the inviting module 708 may indicate the status of each invitation. For example, the inviting module 708 may indicate whether a particular invitation has been accepted yet.

Figure 8:
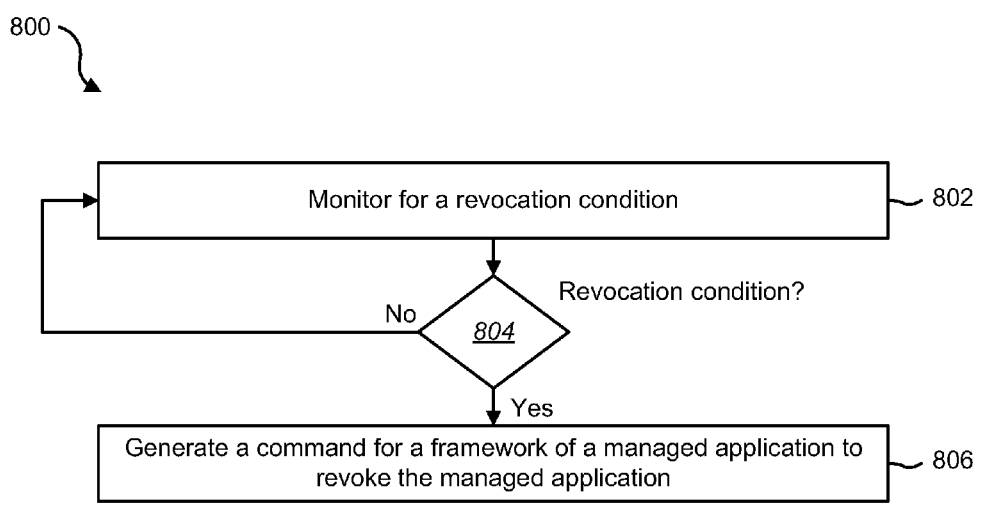
FIG. 8 is a flow diagram illustrating one embodiment of a method to revoke a managed application.

FIG. 8 is a flow diagram illustrating one embodiment of a method 800 to revoke a managed application 104. In some configurations, the method 800 may be implemented by the management module 114 illustrated in FIG. 1 or 2.

At step 802, a device may be monitored for a revocation condition. Examples of a revocation condition include a violation of a policy or a revocation message. At step 804, a determination is made as to whether a revocation condition has occurred. If the revocation condition has not occurred, then the method 800 reverts to step 802 and continues monitoring for a revocation condition. If the revocation condition has occurred, then the method 800 continues to step 806. At step 806, a command may be generated for a framework of a managed application to revoke the managed application. In some cases, the revocation may occur without any outside interaction. For example, a fail safe timer policy may specify communication with a server should occur every 36 hours. If a 36 hour period expires (for example, because the device 102 is lost or stolen) then the managed application 104 may be revoked (e.g., disabled and deleted) without any external communication. In other cases, the revocation may occur as a result of outside communication (a revocation message from an administrator, for example). In some configurations, the revocation may be applied to multiple applications depending on the particular policy settings.

Figure 9:
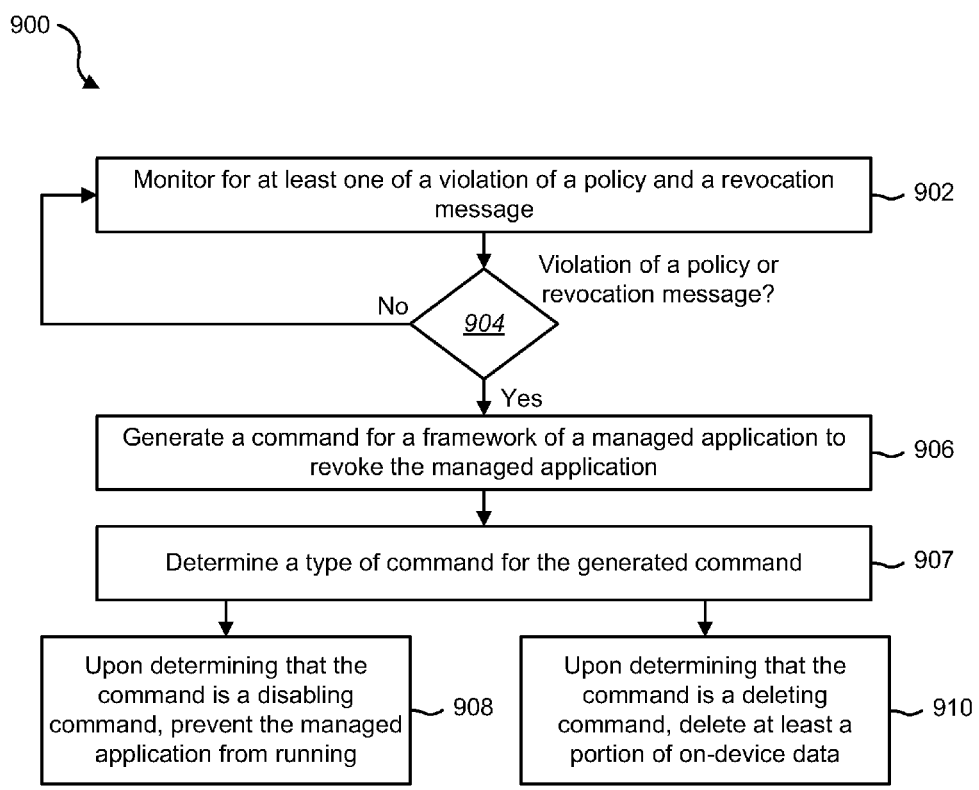
FIG. 9 is a flow diagram illustrating another embodiment of a method to revoke a managed application.

FIG. 9 is a flow diagram illustrating another embodiment of a method 900 to revoke a managed application 104. In some configurations, the method 900 may be implemented by the management module 114 illustrated in FIG. 1 or 2.

At step 902, a device may be monitored for a violation of a policy or for a revocation message. At step 904, a determination is made as to whether a violation of a policy or a revocation message has occurred. If a violation of a policy or a revocation message has not occurred, then the method 900 reverts to step 902 and continues monitoring for a violation of a policy or a revocation message. If a violation of a policy or a revocation message has occurred, then the method 900 continues to step 906. At step 906, a command may be generated for a framework of a managed application to revoke the managed application. At step 907, a type of command may be determined for the generated command. At step 908, upon determining that the command is a disable command, the managed application may be prevented from running. At step 910, upon determining that the command is a deleting command, at least a portion of the on-device data may be deleted.

Figure 10:
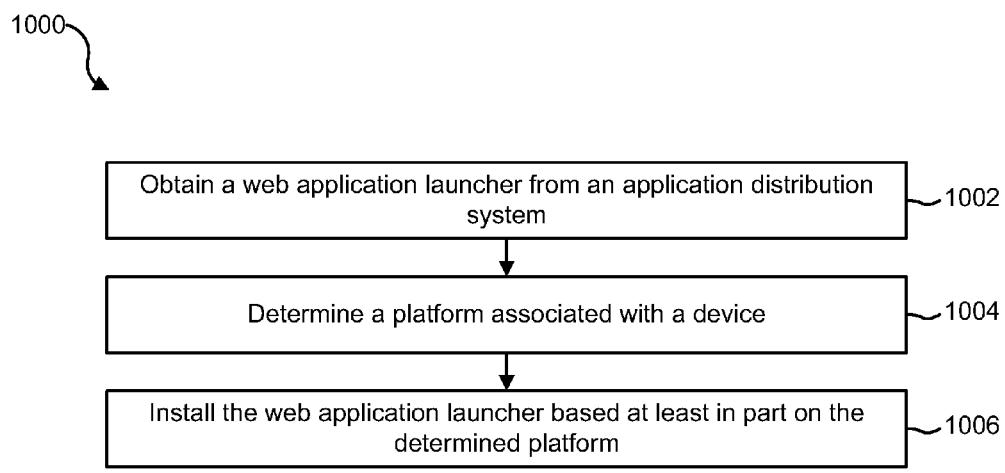
FIG. 10 is a flow diagram illustrating one embodiment of a method to distribute a web application launcher.

FIG. 10 is a flow diagram illustrating one embodiment of a method 1000 to distribute a web application launcher. In some configurations, the method 1000 may be implemented by the management module 114 illustrated in FIG. 1 or 2.

At step 1002, a web application launcher may be obtained from an application distribution system. For example, a web application launcher may be pushed to a plurality of devices (e.g., device 102). At step 1004, a platform associated with a device 102 may be determined. In some cases, the platform may include the operating system 112 of the device 102 and/or the capabilities of the device 102 (device environment, for example). At step 1006, the web application launcher may be installed based at least in part on the determined platform. For example, the installer uses the installation algorithms that enable the web application launcher to be installed on that particular platform. In some cases, the web application launcher may be distributed using an application distribution system (an application market place, for example). In some configurations, the web application launcher may be configured to open the web application in a managed browser that is governed by at least one security policy (e.g., a policy enforcing browser).

Figure 11:
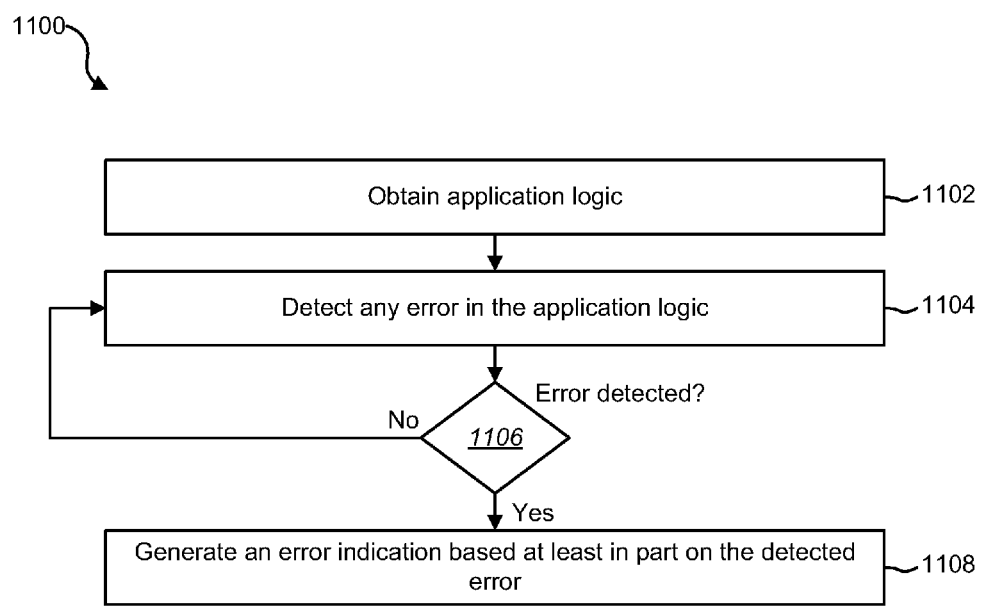
FIG. 11 is a flow diagram illustrating one embodiment of a method to detect an error in application logic.

FIG. 11 is a flow diagram illustrating one embodiment of a method 1100 to detect an error in application logic 106. In some configurations, the method 1100 may be implemented by the binding module 116 illustrated in FIG. 1 or 5.

At step 1102, application logic 106 may be obtained. For example, application logic 106 may be submitted to and received by an application marketplace or application distribution system. At step 1104, any error in the application logic 106 may be detected. For example, any error that would cause a distribution of the application to fail and/or would cause the application to be dysfunctional. At step 1106, a determination is made as to whether an error has been detected. If an error has not been detected, then the method 1100 reverts to step 1104 and continues detecting any errors in the application logic 106. If an error has been detected, then the method 1100 continues to step 1108. At step 1108, an error indication may be generated based at least in part on the detected error. For example, an error indication may be generated so that the error may be corrected or the application rejected. In some configurations, a defect in the provisioning profile or similar components may result in rejection of the application. In other configurations, a defect in the provisioning profile or similar components may not result in rejection if they may be added subsequently without disruption to the user.

Figure 12:
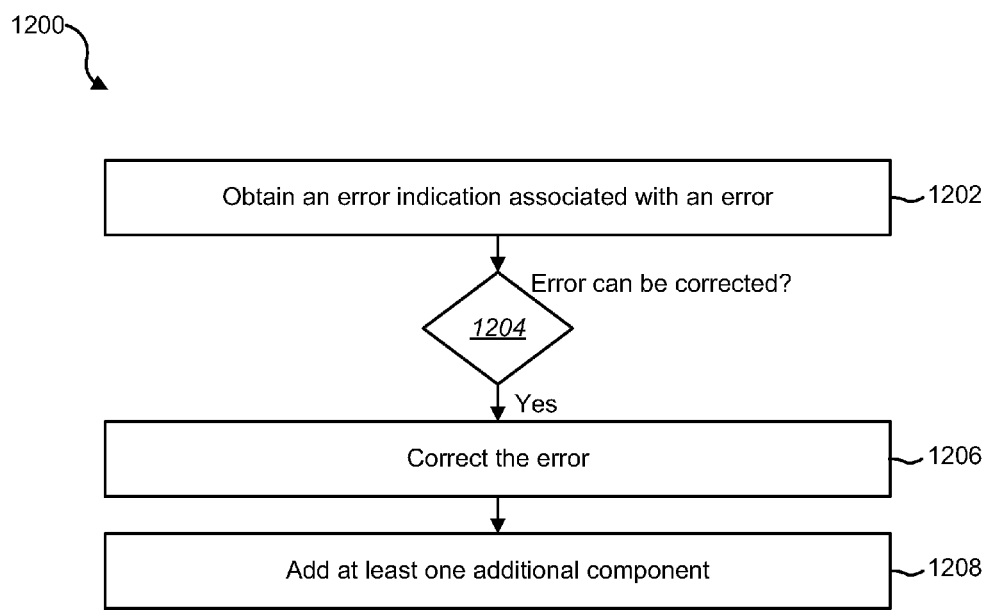
FIG. 12 is a flow diagram illustrating one embodiment of a method to correct an error in the application logic.

FIG. 12 is a flow diagram illustrating one embodiment of a method 1200 to correct an error in the application logic 106.

In some configurations, the method 1200 may be implemented by the binding module 116 illustrated in FIG. 1 or 5.

At step 1202, an error indication associated with an error may be obtained. At step 1204, a determination is made as to whether the error can be corrected. If the error can not be corrected, then the method 1200 ends. If the error can be corrected, then the method 1200 continues at step 1206. At step 1206, the error may be corrected. In one example, one or more components may be added, removed, or changed to correct the error. In some cases, step 1208 may be optional. At step 1208, at least one additional component may be added. For example, desired components (encryption, for example) may be added.

Figure 13:
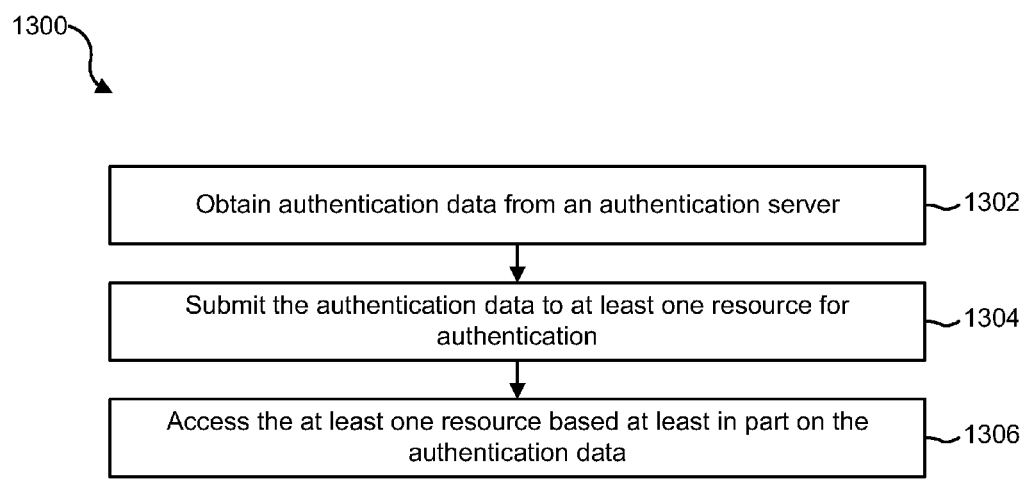
FIG. 13 is a flow diagram illustrating one embodiment of a method to obtain authentication or authorization using authentication data from an external provider.

FIG. 13 is a flow diagram illustrating one embodiment of a method 1300 to obtain authentication or authorization using authentication data from an external provider. In some configurations, the method 1300 may be implemented by the management module 114 illustrated in FIG. 1 or 2.

At step 1302, authentication data may be obtained from an authentication server. For example, the management module 114 may authenticate with an external provider (e.g., the authentication module 124) and may obtain authentication data from the external provider. At step 1304, the authentication data may be submitted to at least one resource (e.g., application marketplace on the first server 120-*a*) for authentication. At step 1306, the at least one resource may be accessed based at least in part on the authentication data. In some cases, the resource is able to extract the authenticity of the authentication data from the authentication data itself. In other cases, the resource verifies the authentication data with the external provider.

Figure 14:
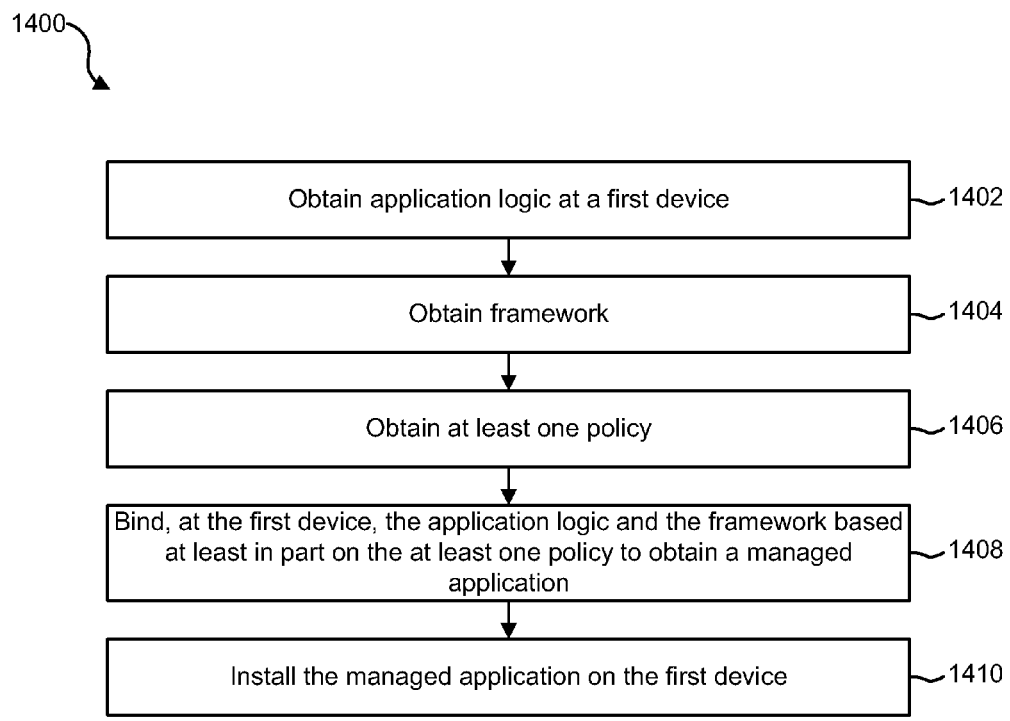
FIG. 14 is a flow diagram illustrating one embodiment of a method to generate a managed application.

FIG. 14 is a flow diagram illustrating one embodiment of a method 1400 to generate a managed application 104. In some configurations, the method 1400 may be implemented by the binding module 116 illustrated in FIG. 1 or 5.

At step 1402, application logic 106 may be obtained at a first device. For example, the application logic 106 may be obtained by the first device by downloading the application logic 106 from an application marketplace (e.g., iTunes, Google Play, etc.). At step 1404, framework 108 may be obtained. At step 1406, at least one policy may be obtained. In one example, the one or more policies may be obtained from an administration module 122. In another example, the one or more policies may be defined by a user on the device 102. At step 1408, the application logic 106 and the framework 108 may be bound together at the first device 102 to obtain a managed application 104. In some configurations, the application logic 106 and the framework 108 may be bound together based at least in part on the at least one policy. In some configurations, the binding operation (e.g., the generation of the managed application 104) may be performed without any communication with outside components. At step 1410, the managed application 104 may be installed on the device 102.

Figure 15:
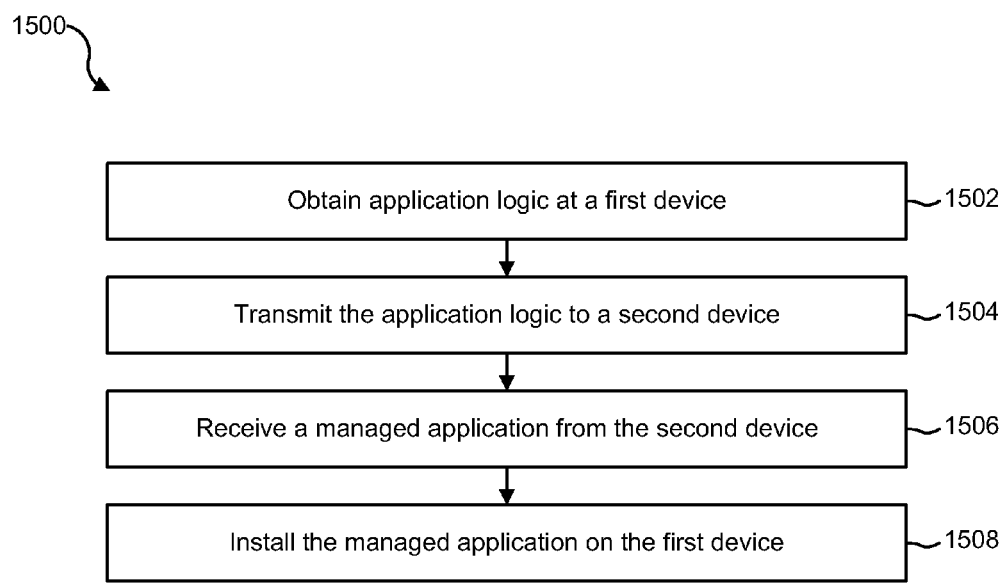
FIG. 15 is a flow diagram illustrating another embodiment of a method to generate a managed application.

FIG. 15 is a flow diagram illustrating another embodiment of a method 1500 to generate a managed application 104. In some configurations, the method 1500 may be implemented by the binding module 116 illustrated in FIG. 1 or 5.

At step 1502, application logic 106 may be obtained at a first device. At step 1504, the application logic 106 may be transmitted to a second device. At step 1506, the managed application 104 may be received from the second device. At step 1508, the managed application may be installed on the first device.

Figure 16:
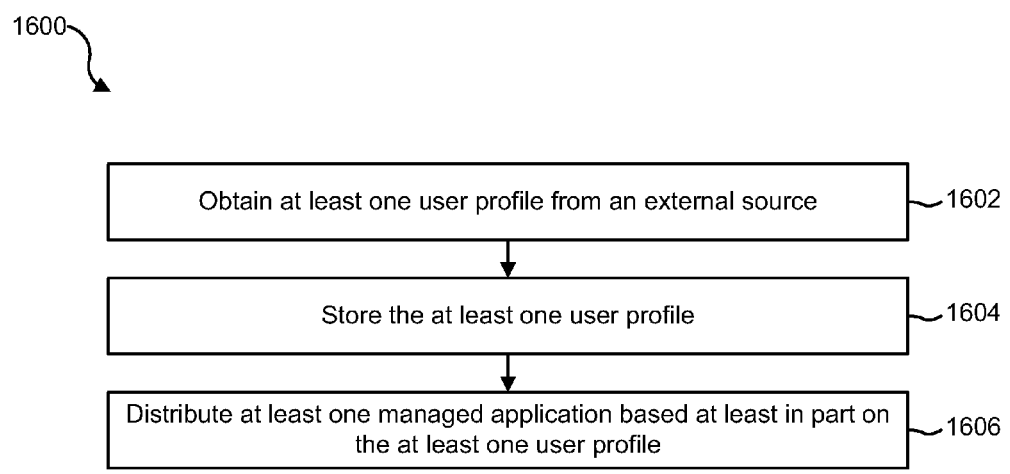
FIG. 16 is a flow diagram illustrating one embodiment of a method to obtain at least one user profile.

FIG. 16 is a flow diagram illustrating one embodiment of a method 1600 to obtain at least one user profile. In some configurations, the method 1600 may be implemented by the administration module 122 illustrated in FIG. 1 or 7.

At step 1602, at least one user profile may be obtained form an external source. Examples of external sources include information repositories and/or databases. For instance, the external source may be a plug in for Microsoft Outlook that allows the needed information from a plurality of selected user profiles to be uploaded in a single transaction. At step 1604, the at least one user profile may be stored. For example, the user profiles may be stored to so that it can be used along with any other user or grouping information in the system. In one embodiment, the selected users may be grouped together with one or more group policies. At step 1606, at least one managed application 104 may be distributed based at least in part on the at least one user profile. For instance, the at least one managed application 104 may be distributed based on one or more individual policies or one or more of the group policies.

Figure 17:
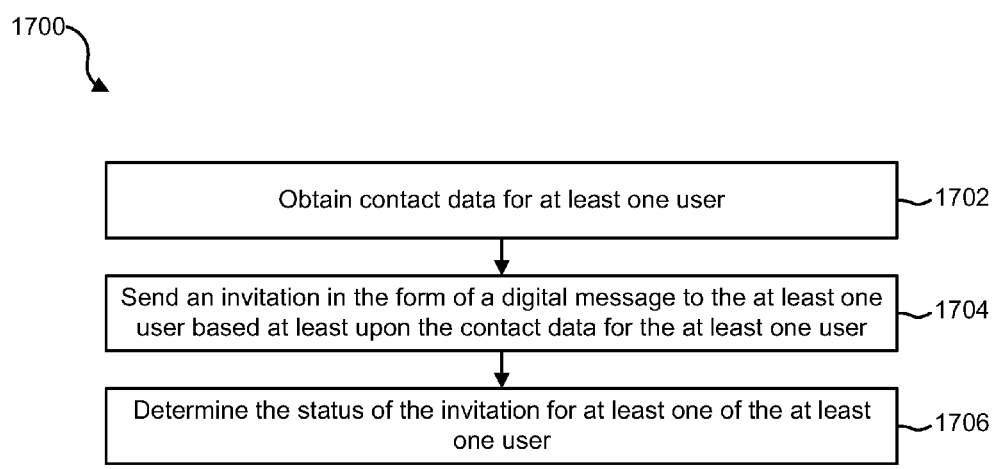
FIG. 17 is a flow diagram illustrating one embodiment of a method to invite at least one user.

FIG. 17 is a flow diagram illustrating one embodiment of a method 1700 to invite at least one user. In some configurations, the method 1700 may be implemented by the administration module 122 illustrated in FIG. 1 or 7.

At step 1702, contact data for at least one user may be obtained. For example, an administrator may use a user interface to invite developers, end-users, and/or other administrators to use the system. In one example, the contact data for the at least one user may be obtained as described above. In another example, the contact data for the at least one user may be submitted by the administrator. At step 1704, an invitation may be sent in the form of a digital message to the at least one user based at least in part on the contact data for the at least one user. In one example, the invitation may include a URL for accepting the invitation. In some cases, the digital message may one or more of an email, SMS message, MMS message, web site, posting on a public forum, etc. At step 1706, the status of the invitation may be determined for at least one of the at least one user. For example, the invitation state may be tracked by the digital message that is used to send the invitation. For example, the digital message may indicate if the message was delivered, read, deleted, accepted, etc. In some cases, the tracking results from the invitations may be collected and presented to the administrator so that the administrator may check the status of each individual invitation. In one example, the URL may differ depending on the type of digital message that is sent so that the administrator may know which digital message was used to accept the invitation.

Figure 18:
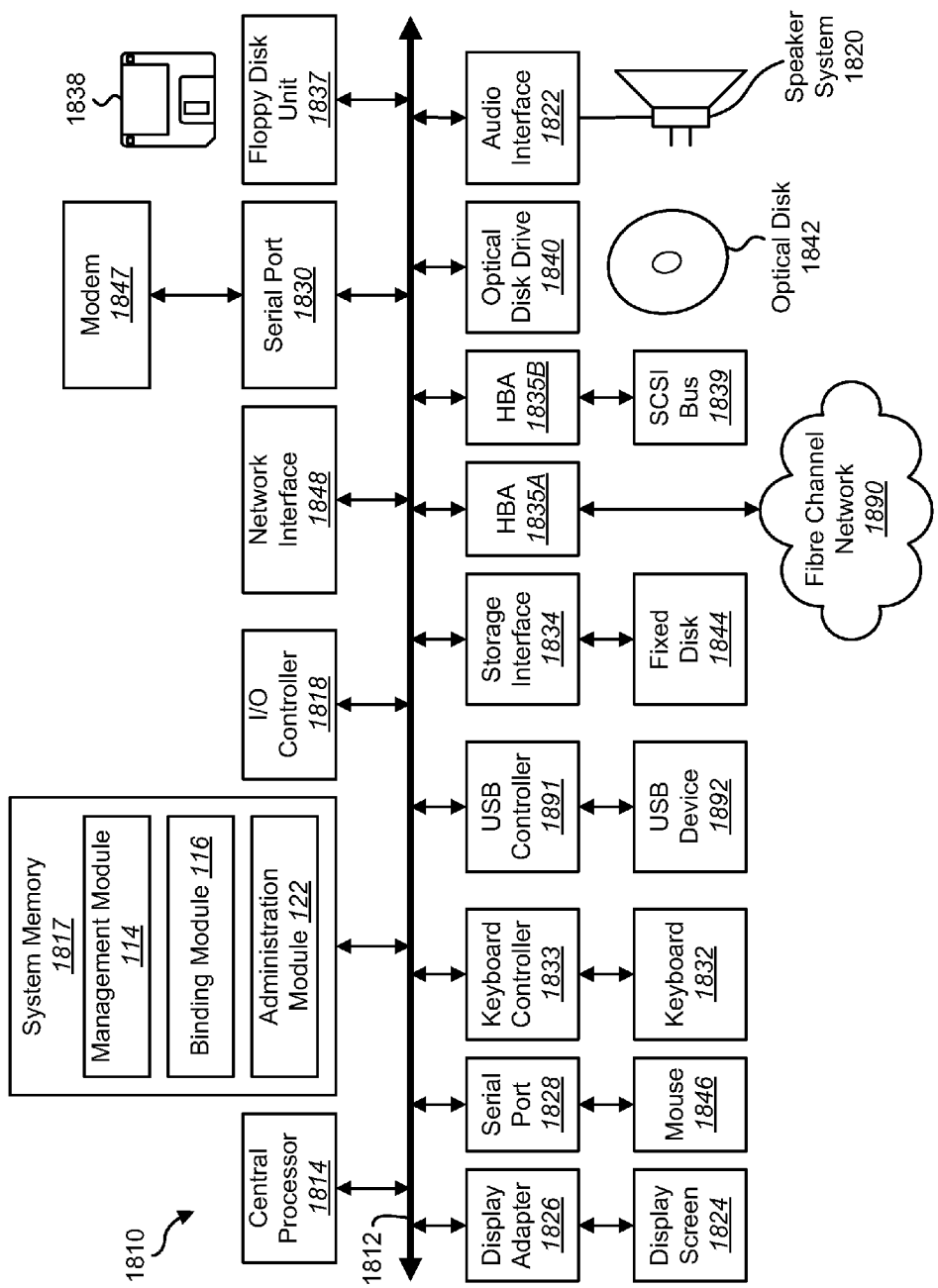
FIG. 18 depicts a block diagram of a computer system suitable for implementing the present systems and methods.

FIG. 18 depicts a block diagram of a computer system 1810 suitable for implementing the present systems and methods. Computer system 1810 includes a bus 1812 which interconnects major subsystems of computer system 1810, such as a central processor 1814, a system memory 1817 (typically RAM, but which may also include ROM, flash RAM, or the like), an input/output controller 1818, an external audio device, such as a speaker system 1820 via an audio output interface 1822, an external device, such as a display screen 1824 via display adapter 1826, serial ports 1828 and 1830, a keyboard 1832 (interfaced with a keyboard controller 1833), multiple USB devices 1892 (interfaced with a USB controller 1891), a storage interface 1834, a floppy disk unit 1837 operative to receive a floppy disk 1838, a host bus adapter (HBA) interface card 1835A operative to connect with a Fibre Channel network 1890, a host bus adapter (HBA) interface card 1835B operative to connect to a SCSI bus 1839, and an optical disk drive 1840 operative to receive an optical disk 1842. Also included are a mouse 1846 (or other point-and-click device, coupled to bus 1812 via serial port 1828), a modem 1847

(coupled to bus 1812 via serial port 1830), and a network interface 1848 (coupled directly to bus 1812).

Bus 1812 allows data communication between central processor 1814 and system memory 1817, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the management module 114, the binding module 116, and/or the administration module 122 to implement the present systems and methods may be stored within the system memory 1817. Applications resident with computer system 1810 are generally stored on and accessed via a non-transitory computer readable medium, such as a hard disk drive (e.g., fixed disk 1844), an optical drive (e.g., optical drive 1840), a floppy disk unit 1837, or other storage medium. Additionally, applications can be in the form of electronic signals modulated in accordance with the application and data communication technology when accessed via network modem 1847 or interface 1848.

Storage interface 1834, as with the other storage interfaces of computer system 1810, can connect to a standard computer readable medium for storage and/or retrieval of information, such as a fixed disk drive 1844. Fixed disk drive 1844 may be a part of computer system 1810 or may be separate and accessed through other interface systems. Modem 1847 may provide a direct connection to a remote server via a telephone link or to the Internet via an internet service provider (ISP). Network interface 1848 may provide a direct connection to a remote server via a direct network link to the Internet via a POP (point of presence). Network interface 1848 may provide such connection using wireless techniques, including digital cellular telephone connection, Cellular Digital Packet Data (CDPD) connection, digital satellite data connection, or the like.

Many other devices or subsystems (not shown) may be connected in a similar manner (e.g., document scanners, digital cameras, and so on). Conversely, all of the devices shown in FIG. 18 need not be present to practice the present systems and methods. The devices and subsystems can be interconnected in different ways from that shown in FIG. 18. The operation of a computer system such as that shown in FIG. 18 is readily known in the art and is not discussed in detail in this application. Code to implement the present disclosure can be stored in a non-transitory computer-readable medium such as one or more of system memory 1817, fixed disk 1844, optical disk 1842, or floppy disk 1838. The operating system provided on computer system 1810 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 19:
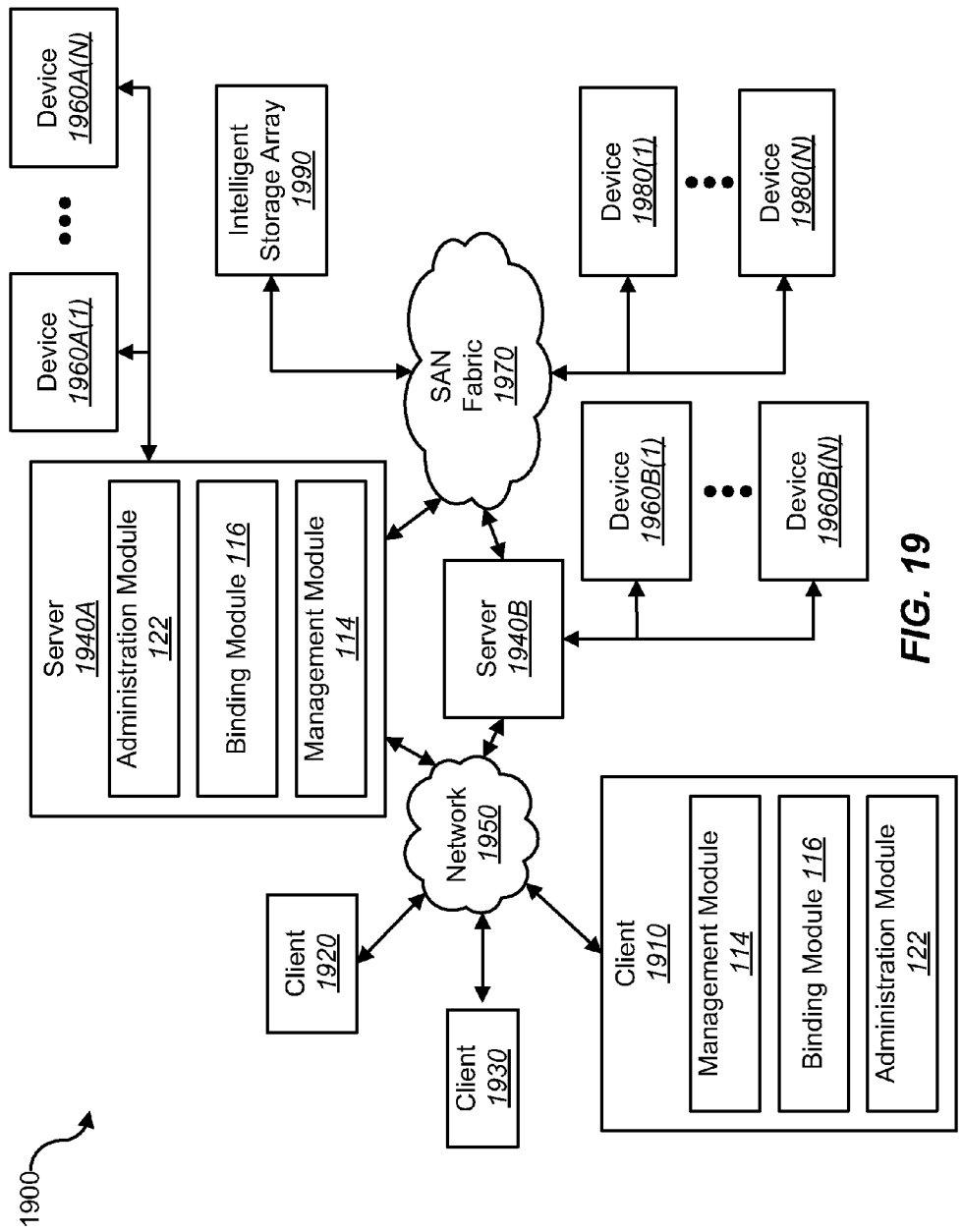
FIG. 19 is a block diagram depicting a network architecture in which client systems, as well as storage servers (any of which can be implemented using a computer system), are coupled to a network.

FIG. 19 is a block diagram depicting a network architecture 1900 in which client systems 1910, 1920 and 1930, as well as storage servers 1940A, 1940B (any of which can be implemented using computer system 1810), are coupled to a network 1950. In one embodiment, the management module 114, the binding module 116, and/or the administration module 122 may be located within the storage servers 1940A, 1940B and/or the client systems 1910, 1920, 1930 to implement the present systems and methods. The storage server 1940A is further depicted as having storage devices 1960A(1)-(N) directly attached, and storage server 1940B is depicted with storage devices 1960B(1)-(N) directly attached. SAN fabric 1970 supports access to storage devices 1980(1)-(N) by storage servers 1940A, 1940B, and so by client systems 1910, 1920 and 1930 via network 1950. Intelligent storage array 1990 is also shown as an example of a specific storage device accessible via SAN fabric 1970.

With reference to computer system 1810, modem 1847, network interface 1848, or some other method can be used to provide connectivity from each of client computer systems 1910, 1920, and 1930 to network 1950. Client systems 1910, 1920, and 1930 are able to access information on storage server 1940A or 1940B using, for example, a web browser, or other client software (not shown). Such a client allows client systems 1910, 1920, and 1930 to access data hosted by storage server 1940A or 1940B or one of storage devices 1960A(1)-(N), 1960B(1)-(N), 1980(1)-(N) or intelligent storage array 990. FIG. 19 depicts the use of a network such as the Internet for exchanging data, but the present systems and methods are not limited to the Internet or any particular network-based environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method to revoke an application, comprising:
   obtaining application logic from an online application marketplace;
   obtaining a framework, wherein the framework is configured to manage an interaction between the application logic and an operating system of a device;
   obtaining at least one policy;
   binding the framework to the application logic according to the at least one policy, wherein binding the framework to the application logic comprises creating a verifiable association between the framework and the application logic, and wherein binding the framework to the application logic results in a managed application;
   monitoring, by a processor, for a revocation condition;
   upon detection of the revocation condition, generating a command for the framework of the managed application to revoke the managed application;
   distinguishing between data generated via the managed application for work purposes and data generated for personal use; and
   upon determining that the command is a deleting command, deleting at least a portion of the data generated for work purposes while maintaining the data generated for personal use.

2. The method of claim 1, further comprising:
   determining whether the command is a disabling command; and
   upon determining that the command is a disabling command, preventing the managed application from running.

3. The method of claim 1, wherein the revocation condition comprises a revocation message.

4. The method of claim 1, wherein the revocation condition comprises a violation of the at least one policy.

5. The method of claim 4, wherein the at least one policy comprises a requirement for the operating system.

6. The method of claim 4, wherein the at least one policy comprises a requirement for the managed application.

7. The method of claim 4, wherein the at least one policy is built into the framework of the managed application.

8. The method of claim 4, further comprising:
   monitoring the at least one policy; and
   determining that the at least one policy has been violated.

9. The method of claim 1, further comprising:
   providing authentication data to the managed application, wherein the authentication data is configured to enable at least one of the managed application and an unmanaged application to access a resource; and
   upon determining that the command is a deleting command, deleting at least a portion of data associated with the authentication data.

10. A computing device configured to revoke an application, comprising:
    a processor;
    memory in electronic communication with the processor;
    instructions stored in the memory, the instructions being executable by the processor to:
       obtain application logic from an online application marketplace;
       obtain a framework, wherein the framework is configured to manage an interaction between the application logic and an operating system of the device;
       obtain at least one policy;
       bind the framework to the application logic, wherein binding the framework to the application logic comprises creating a verifiable association between the framework and the application logic, and wherein binding the framework to the application logic results in a managed application;
       monitor for a revocation condition;
       upon detection of the revocation condition, generate a command for the framework of the managed application to revoke the managed application;
       distinguish between data generated via the managed application for work purposes and data generated for personal use; and
       upon determining that the command is a deleting command, delete at least a portion of the data generated for work purposes while maintaining the data generated for personal use.

11. The computing device of claim 10, wherein the instructions are further executable by the processor to:
    determine whether the command is a disabling command; and
    upon determining that the command is a disabling command, prevent the managed application from running.

12. The computing device of claim 10, wherein the revocation condition comprises a revocation message.

13. The computing device of claim 10, wherein the revocation condition comprises a violation of the at least one policy.

14. The computing device of claim 13, wherein the at least one policy comprises a requirement for the operating system.

15. The computing device of claim 13, wherein the at least one policy comprises a requirement for the managed application.

16. The computing device of claim 13, wherein the at least one policy is built into the framework of the managed application.

17. The computing device of claim 13, wherein the instructions are further executable by the processor to:
    monitor the at least one policy; and
    determine that the at least one policy has been violated.

18. A computer-program product to revoke an application, the computer-program product comprising a non-transitory computer-readable storage medium that stores computer executable instructions, the instructions being executable by a processor to:
- obtain application logic from an online application marketplace;
- obtain a framework, wherein the framework is configured to manage an interaction between the application logic and an operating system of a device;
- obtain at least one policy;
- bind the framework to the application logic, wherein binding the framework to the application logic comprises creating a verifiable association between the framework and the application logic, and wherein binding the framework to the application logic results in a managed application;
- monitor for a revocation condition;
- upon detection of the revocation condition, generate a command for the framework of the managed application to revoke the managed application;
- distinguish between data generated via the managed application for work purposes and data generated for personal use; and
- upon determining that the command is a deleting command, delete at least a portion of the data generated for work purposes while maintaining the data generated for personal use.

* * * * *